Dec. 11, 1956 B. D. LOUGHLIN 2,774,072

COLOR-TELEVISION SYSTEM

Filed May 25, 1950 4 Sheets-Sheet 1

INVENTOR.
BERNARD D. LOUGHLIN
BY Laurence B. Dodds
ATTORNEY

INVENTOR.
BERNARD D. LOUGHLIN
BY Lawrence B. Dodds
ATTORNEY

Dec. 11, 1956 B. D. LOUGHLIN 2,774,072

COLOR-TELEVISION SYSTEM

Filed May 25, 1950 4 Sheets-Sheet 3

INVENTOR.
BERNARD D. LOUGHLIN

BY Laurence B. Dodds

ATTORNEY

Dec. 11, 1956 B. D. LOUGHLIN 2,774,072

COLOR-TELEVISION SYSTEM

Filed May 25, 1950 4 Sheets-Sheet 4

INVENTOR.
BERNARD D. LOUGHLIN

BY Laurence B. Dodds

ATTORNEY 2,774,072

COLOR-TELEVISION SYSTEM

Bernard D. Loughlin, Lynbrook, N. Y., assignor to Hazeltine Research, Inc., Chicago, Ill., a corporation of Illinois Application May 25, 1950, Serial No. 164,114

22 Claims. (Cl. 178—5.2)

*General*

Figure 1:
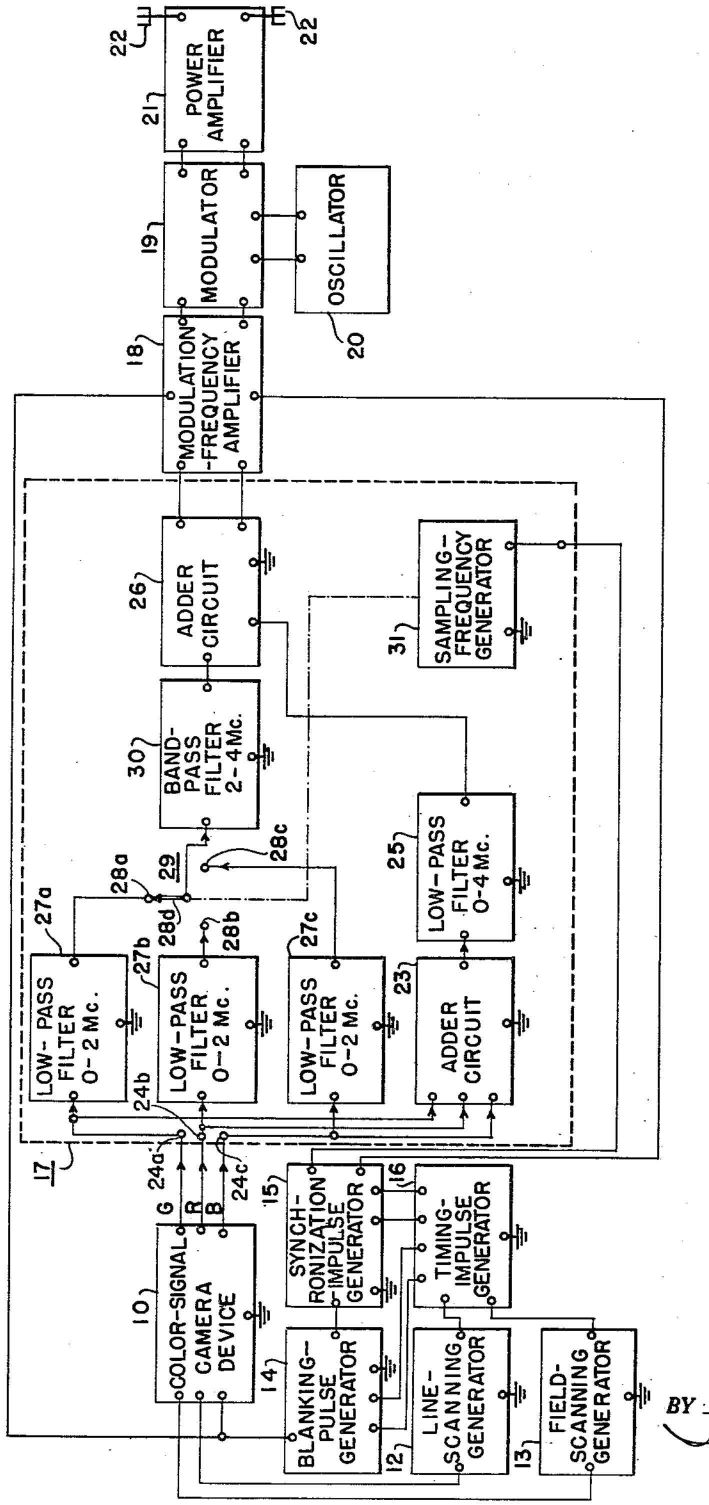

The present invention relates in general to color-television systems, and especially to such systems compatible with monochrome systems embodying present broadcasting standards. More particularly the invention relates to new and improved signal-translating systems useful in a color-television receiver, which have the characteristics of simplifying the receiver by diminishing the need for critical matching of color-signal filter networks and of providing improved signal gain characteristics.

A compatible color-television system is one which provides a color-television signal that may be utilized to produce in a conventional monochrome receiver, without the use of a converter or adapter, a black-and-white image that is equivalent in all respects to the images normally produced therein. In such a system all of the line-scanning and field-scanning frequencies are the same as those in the conventional monochrome system and the composite video-frequency component of the color-television signal is developed in such a manner that those signals representative primarily of the color characteristics thereof have low visibility when viewed on the conventional monochrome receiver.

In a color-television receiver, reproduction of the image may be effected by a single color tube or a plurality of color tubes. In one system heretofore proposed utilizing a plurality of tubes, a number of related electron beams are so generated as to scan and illuminate the screens of a similar number of cathode-ray tubes in a series of fields of parallel lines. The composite video-frequency signal is analyzed and the monochrome components and color-signal components selected therefrom are applied to control the intensities of the electron beams in the cathode-ray tubes, thereby controlling the brightness and color characteristics of the images reproduced on the screens of these tubes. The line-scanning, field-scanning and color-sampling synchronizing components are separated from the composite video-frequency signal and from each other and are utilized respectively to synchronize the operation of the receiver line-scanning, field-scanning and color-signal selection apparatus with similar apparatus utilized at the transmitter in developing the composite video-frequency signal. The televised image, in either monochrome or color, is thereby reconstructed at the receiver as a black-and-white or color picture.

In one form of compatible television system, more fully described in the RCA Review for December 1949, volume X, No. 4, pages 504–524, the primary colors of the image being televised are sampled at the transmitter by a device having symmetrical electrical characteristics with respect to these colors, thereby developing approximately the same amount of electrical signal energy for green, red and blue color signals of similar color intensities. The sampling process develops a composite color signal having a color subcarrier-wave signal of a frequency of approximately 3.8 megacycles which has amplitude and phase characteristics related to the different color-signal characteristics, being modulated by those color signals having frequencies within the band of 0–2 megacycles. In addition, a monochrome component is developed from the composite color signals, being composed of equal energy values of green, red and blue and having a bandwidth of 0–4 megacycles. The sum of this monochrome component and composite color-signal components produces a composite video-frequency signal. A sampling device similar to that just described is utilized at the receiver, sampling the composite video-frequency signal at 120° intervals to derive the 0–2 megacycle color signals therefrom. These color signals are then combined with the high-frequency components of the received monochrome signal to provide color signals of high resolution for application to the control electrodes of the cathode-ray tubes.

A television system of the type just described is designed to transmit signals having a total information bandwidth of approximately 8 megacycles through a pass band of approximately 4 megacycles. For this reason the sampling signal, or color-signal subcarrier wave, is chosen to have substantially as high a frequency (3.8 megacycles) as the apparatus having a 4 megacycle pass band will translate, in order that color-signal components of substantially 0–2 megacycle frequencies may be utilized as modulation frequencies thereof. The higher frequency color-signal components of the resultant signal, that is, those having frequencies between 2 and 4 megacycles, are then combined in time sequence to compose the mixed-high component of the monochrome signal.

In one type of receiver used with this system, both the color-signal components and the monochrome signal are translated through the sampling channel to provide the color signals. In another type of receiver also used with this system, a separate channel is used to by-pass the 2–4 megacycle component of the monochrome signal around the sampling channel. Receivers of the type just described have certain undesirable features. In order to obtain the reproduction of saturated colors, a very narrow pulse-width type of sampling is normally utilized, thereby greatly decreasing the amount of signal energy passing through the sampling device. Therefore, additional signal amplifier stages are required. If wide pulse-width type sampling is utilized in either of the above-described receivers, the reproduced colors are normally less saturated than those in the image being televised. Since the low-frequency portion of the monochrome signal is translated through the sampling channel, the signal that is sampled is a composite video-frequency signal, thereby practically necessitating that a direct-current reinserter stage be included in the circuit in order to maintain proper color-signal levels. Also, in view of the need for 0–2 megacycle low-pass filter networks in each of the color-signal channels and of a 2–4 megacycle band-pass filter network in the mixed-high channel, there is presented the problem of critically matching the signal gain and cutoff-frequency characteristics of these networks in order to maintain the proper relationships between the signals being translated therethrough. The latter problem is also present when only monochrome signals are being received and black-and-white images are being reproduced.

The principle of mixed-high frequency-information translation teaches that the resolution of the reproduced image depends primarily on the quality of the monochrome component of the composite video-frequency signal. Therefore, it is extremely important that high-fidelity translation of this component be effected.

It is known that conventional transmission systems normally do not translate signals of all frequencies with the same fidelity. Therefore, in a system of the type described above, the 3.8 megacycle wave signal modulated by the color-signal components may not be translated with the same gain as the monochrome signal. Thus, in such receivers, there may be reproduced a color picture which may have colors considerably less saturated than those in the original scene. It would be advantageous to provide in these receivers a simple and convenient color-saturation control, which is difficult as these receivers are now designed.

Also, it is well known to those skilled in the art that, in an average color scene, the percentage of saturated color present is very low, resulting in a low average value of color saturation. In other words, the major portion of the energy present in a reproduced image is found in the monochrome component. This provides an additional reason for effecting high-fidelity translation of this component. Since, the receivers described above, at least portions of the monochrome signal are translated through the sampling channels, which channels may have nonlinear translation characteristics, high fidelity of the monochrome component is not easily obtained.

In both receivers of the type mentioned above, the sampling frequency of 3.8 megacycles heterodynes with color-signal components in the vicinity of the sampling frequency to produce the desired 0.2 megacycle color signals to be applied to the control electrodes of the cathode-ray tubes. Because of this heterodyning action, noise pulses and other interference signals having certain frequencies will beat with the 3.8 megacycle sampling signal to develop a resultant signal. If the interfering signal has a frequency in the range of 2–4 megacycles, the resultant signal will have a relatively low frequency in the range of 0–1.8 megacycles, which is much more noticeable in the reproduced image than the original higher frequency interference signals. For example, if the interfering signal has a frequency of 3.7 megacycles, there will be a resultant interfering signal of 0.1 megacycle, which is very visible in the reproduced image. Such interference signal may also be a component of the monochrome signal. If such components of the monochrome signal should appear in the channel including the sampling device, results similar to those just discussed will be obtained. Therefore, it is desirable to eliminate as much of this low-frequency interference as possible.

It is an object of the present invention, therefore, to provide a new and improved color-television system which avoids one or more of the aforementioned limitations of systems of the type described.

It is another object of the present invention to provide a new and improved color-television system in which at least some of the circuits of the receiver are greatly simplified.

It is still another object of the invention to provide a new and improved color-television system which does not require the utilization of direct-current reinserter devices in the sampling channels thereof.

It is a still further object of the invention to provide in a color-television system a new and improved television receiver in which only composite color-signal components are sampled.

It is an additional object of the invention to provide in a color-television system a new and improved television receiver haiving improved signal gain characteristics.

It is also an object of the invention to provide in a color-television system a new and improved television receiver having a simple means for controlling the saturation of the colors in a reproduced image.

It is a still additional object of the invention to provide in a color-television system a new and improved television receiver providing high-fidelity translation of monochrome signals without requiring critical matching of filter networks.

It is also an additional object of the invention to provide in a color-television system a new and improved television receiver in which any nonlinear signal-translation characteristics present in sampling devices included therein do not affect the fidelity of the monochrome signal.

In accordance with the present invention there is provided an improved signal-translating system for use in a color-television receiver for translating a first wave signal modulated by a color-television signal representative of a color image and having as components a monochrome signal and another wave signal modulated by color-signal components. The signal-translating system includes a circuit for supplying a first wave signal of the type described and for developing a signal representative of the monochrome signal and a signal representative of the other wave signal and includes a first channel coupled to the supply circuit and having circuit elements proportioned to translate the monochrome-representative signal comprising modulation-signal components occupying a predetermined frequency band. The signal-translating system also includes a second channel coupled to the supply circuit and including a modulator arrangement for deriving from the signal representative of the modulated other wave signal at least one signal representative of a color characteristic of the image and for translating the derived signal while discriminating against signals representative of the monochrome signal, the translated derived signal comprising modulation-signal components occupying a band overlapping the predetermined frequency band. Finally, the signal-translating system includes an output circuit means coupled to the first and second channels for supplying the translated monochrome-representative signal and the derived color-characteristic signal.

For a better understanding of the present invention, together with other and further objects thereof, reference is had to the following description taken in connection with the accompanying drawings, and its scope will be pointed out in the appended claims.

Figure 2A:
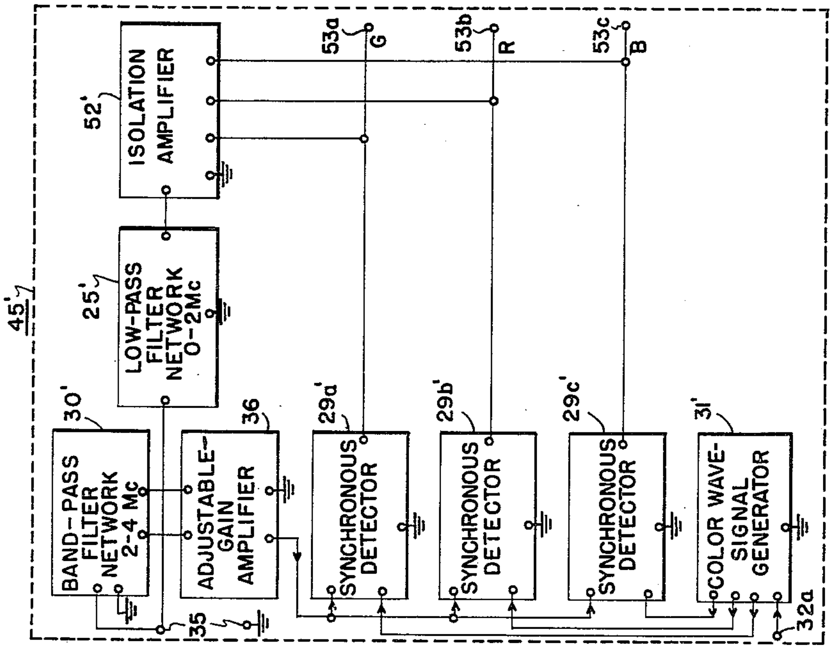
Figure 1A:
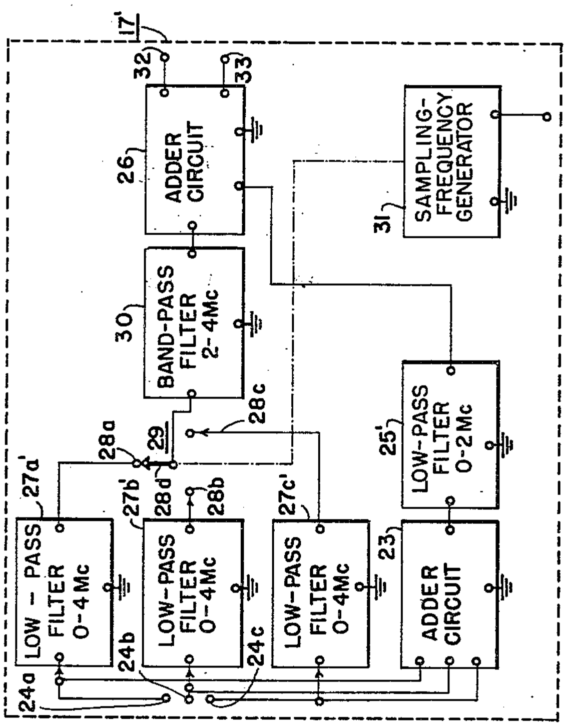
Figure 2:
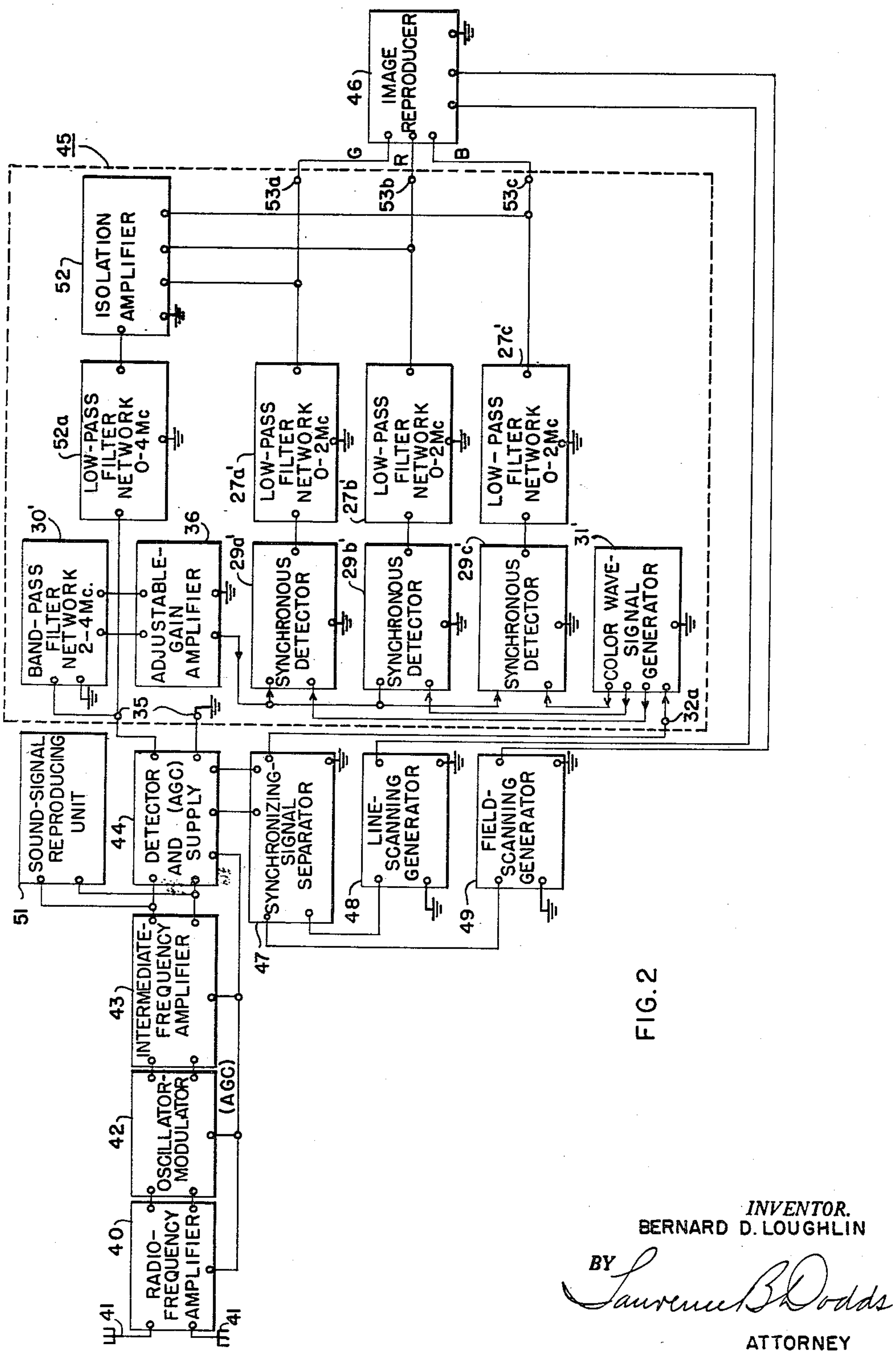
Figure 3:
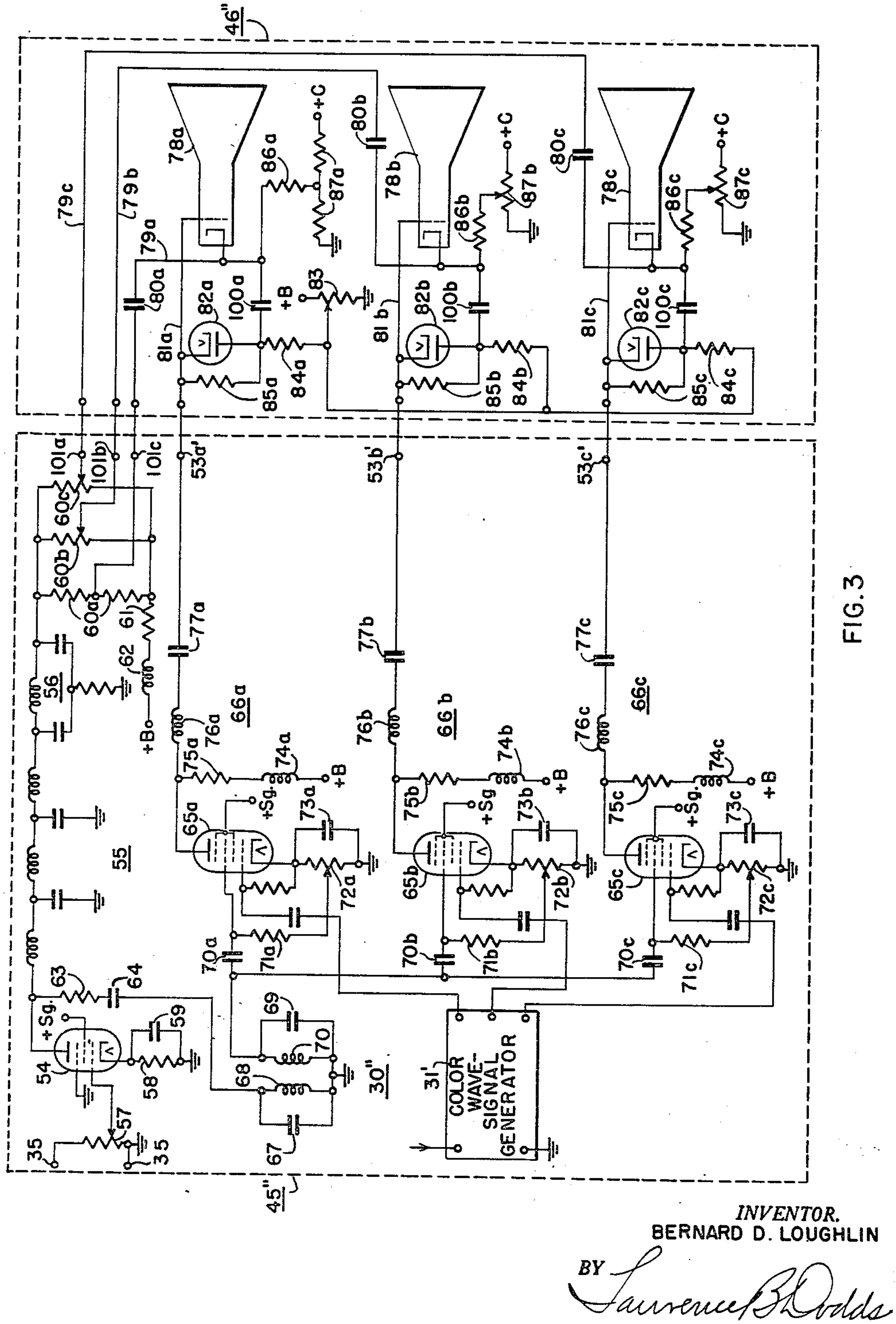

In the drawings, Figs. 1 and 2 are circuit diagrams of a transmitter and receiver, respectively, of a complete television system embodying the invention in one form; Fig. 1*a* is a circuit diagram of a modified signal-translating system embodying the invention which may be utilized in a transmitter of the type represented by Fig. 1; Fig. 2*a* is a diagram illustrating a modification of the signal-translating system of Fig. 2; and Fig. 3 is a schematic diagram of a circuit arrangement embodying the invention in a particular form which may be used as part of the receiver of Fig. 2.

The term "monochrome signal" as used herein and in the appended claims represents that portion of the composite video-frequency signal that would be reproduced as an image in a standard monochrome receiver. Thus the monochrome signal can be considered substantially to be the average of the composite video-frequency signal over a complete sampling cycle; in other words, the composite video-frequency signal with any subcarrier signals and their modulation components, inserted to translate the color characteristics of an image, removed. The monochrome signal may be a signal including equal amounts of all color signals or may be a signal composed of a predominant amount of one of the primary colors.

The term "color signal" as used herein and in the appended claims represents a signal the instantaneous value of which is proportional to the intensity of a primary color of an elemental area of the image being scanned at the transmitter. Portions of the frequency band of this signal are designated as color-signal components.

The term "composite color-signal component" as used herein and in the appended claims represents that signal formed by the modulation of a generated color-wave signal or subcarrier-wave signal by selected frequency components of the color signal or, in other words, by color-signal components. The composite color-signal component has amplitude and phase characteristics related to the color characteristics of the image being televised.

The term "composite video-frequency component" as used herein and in the appended claims represents a signal resulting from the combination of the monochrome signal and the composite color-signal component.

The expression "first wave signal modulated by a composite video-frequency signal having as components a monochrome signal and another wave signal modulated by color-signal components" as used herein and in the appended claims should not be strictly construed to apply only to a carrier-wave signal modulated by a modulated subcarrier-wave signal. It is intended that this expression also apply to the resultant signal developed by a modulation process wherein a first wave signal modulated by a monochrome signal may be developed and a second wave signal modulated by color components also developed, the frequencies of the first and second wave signals being so close to each other that both signals are essentially wholly within the bounds of a selected frequency spectrum, for example, wholly within the limits of a television channel. In the latter process though two separate wave signals may have been developed at the transmitter, their proximity to each other in frequency causes the resultant composite signal formed by the two modulated signals to be indistinguishable from a first wave signal modulated by a composite video-frequency signal having as components a monochrome signal and another wave signal modulated by color-signal components.

*Description of color-television transmitter of Fig. 1*

Referring now more particularly to Fig. 1 of the drawings, there is represented a color-television transmitting system for developing and transmitting a modulated wave signal. This transmitter comprises means for generating color signals during trace periods, such as a color-signal camera device 10. The device 10 may be of conventional design including one or more cathode-ray signal-generating tubes, but for the purpose of simplicity in description, it will be assumed that it includes three cathode-ray tubes, each individually responsive to different colors, in particular, to the primary colors red, green and blue. These tubes have the usual electron-gun structures and photosensitive target and line-scanning and field-scanning means. There are also provided in the transmitter a line-scanning generator 12 and a field-scanning generator 13 with their output circuits connected directly to the line-scanning and field-scanning means in device 10. In order to provide blanking pulses for blocking out or for suppressing undesirable impulses in, and ensuring the proper wave form of, the modulation signal developed by the device 10, there is provided a blanking-pulse generator 14 having its output circuit coupled to the control electrodes of the cathode-ray tubes in the device 10. A synchronization-impulse generator 15 is also provided for developing synchronizing impulses for the signal to be transmitted, to permit synchronization between the transmitter and receiver. Output circuits of the generator 15 are connected to a modulation-frequency amplifier 18 to be further referred to hereinafter and a sampling-frequency generator 31 to be further described hereinafter. In order to synchronize the operations of the generators 12, 13, 14 and 15, there is provided a timing-impulse generator 16 having a plurality of output circuits individually coupled to the generators just mentioned.

Connected in cascade to the output circuits of the signal-generating tubes in camera device 10, in the order named, are a signal-translating system 17 to be further described in detail hereinafter, the modulation-frequency amplifier 18, a modulator 19 to which is also coupled an oscillator 20, and a power amplifier 21 the output of which is applied to a transmitting antenna system 22, 22 as shown.

*Operation of transmitter of Fig. 1*

Neglecting for the moment the detailed operation and description of the signal-translating system 17 provided in accordance with the present invention, the transmitter just described includes the essential components of a color-television transmitting system of conventional design, all the parts illustrated schematically being of well-known suitable construction so that a detailed description thereof and their operation is unnecessary herein. Briefly, however, the image of the scene to be televised is focused upon the target of each camera tube of the device 10 and the cathode-ray beams of each of the camera tubes are developed, accelerated and individually focused on the separate targets. Color-filter systems are provided in the device 10 for each camera tube so that the color signals representative of each of the primary colors will be developed separately on the targets in different camera tubes. Conventional scanning or deflection currents are developed by the generators 12 and 13 and utilized to deflect the beams to scan successive series or fields of parallel lines on the targets. Blanking pulses developed by the generator 14 are applied to the control electrodes of the camera tubes to suppress or block out the scanning beam during retrace portions of the scanning cycles and are applied to the amplifier 18 to suppress or block out undesirable pulses developed in the system and to aid in obtaining the required wave form of the video-modulation signal developed in the output circuit of unit 18.

The photosensitive elements of a camera tube target being electrically affected by the varying values of light and shade of corresponding incremental areas of the image focused thereon, as the cathode-ray beams scan the targets, voltages of correspondingly varying amplitude are developed in the output circuit of each of the camera tubes and separately applied to terminals **24*a*, 24*b* and 24*c* of the unit 17 over the circuits R, B and G. Components of these color signals are then combined in the unit 17, in a manner to be described more fully hereinafter, to form a composite color signal which is applied to the amplifier 18 and thereupon supplied to the modulator 19, wherein it is impressed upon the wave signal generated by the oscillator 20. The modulated wave signal is then applied through the amplifier 21 to the antenna system 22, 22** for radiation.

*Description of signal-translating apparatus of Fig. 1*

Referring now more particularly to the signal-translating system 17 embodying one form of the present invention, this unit comprises a means for developing a composite video-frequency signal and includes a first signal-translating channel for developing a monochrome component from the applied color-signal components, specifically for combining at least certain color-signal components to develop a momochrome signal. In particular, this channel includes an adder circuit 23 to which the color signals applied to the terminals **24*a*, 24*b* and 24*c* are applied and circuit elements such as a low-pass filter network 25 coupled in series with the adder circuit 23 and so proportioned as to translate at least the low-frequency components of the monochrome signal, usually the components having frequencies of less than 4 megacycles. The output circuit of the unit 25 is coupled to a second adder circuit 26. Each of the adder circuits 23, 26** may comprise a conventional high-impedance combining amplifier.

The unit 17 also includes a second signal-translating channel coupled in circuit with the first channel for translating at least one of the color-signal components and for deriving a composite color-signal component therefrom. The second channel comprises low-pass filter networks **27*a*, 27*b* and 27*c* proportioned to pass the frequency band of 0–2 megacycles and having input circuits connected respectively to the terminals 24*a*, 24*b* and 24*c* and output terminals respectively connected to stationary contact members 28*a*, 28*b* and 28*c* of a switching device 29 also included in the second channel and having a rotatable contact 28*d***. It is to be understood that, though for simplicity of representation and explanation, the device 29 is represented as a mechanical switching device, this device will normally, because of the high switching frequency involved, be an electronic type of switch. One type of such device is further described in the RCA Review article referred to above. Contact 28*d* is connected to a band-pass filter network 30, also part of the second channel, which is so proportioned as to pass the frequency band of 2–4 megacycles and which has an output circuit coupled to the adder circuit 26.

The adder circuit 26 comprises means for combining the monochrome component translated through the first channel, including the units 23 and 25, and the composite color-signal component translated through the second channel, including the units 27*a*, 27*b*, 27*c*, 29 and 30, to produce a composite color signal.

The signal-translating apparatus 17 also includes the sampling-frequency generator 31, of conventional oscillator design, the input circuit of which is coupled to the synchronization-impulse generator 15 and the output circuit of which is electrically or mechanically coupled to the switching device 29.

*Operation of signal-translating system of Fig. 1*

In the signal-translating system 17, the color signals having frequencies between 0 and 4 megacycles and corresponding to primary color values such as red, green and blue of the scene being televised, are individually developed in camera 10, and are simultaneously applied through the terminals 24*a*, 24*b* and 24*c* to the input circuit of the adder circuit 23 wherein they are combined in a predetermined proportion to provide a monochrome signal having a bandwidth of 0.4 megacycles and constituting a high-definition representation of the televised image. This monochrome signal is translated through the 0–4 megacycle low-pass filter network 25 and applied to the adder circuit 26 to provide at least a monochrome component therein. Simultaneously, in the second signal-translating channel, the individual color signals applied to the terminals 24*a*, 24*b* and 24*c* are respectively applied to the low-pass filter networks 27*a*, 27*b* and 27*c*, components within the frequency band of 0.2 megacycles or less being translated therethrough in a manner permitting them to retain their separate color-signal identities, and are then respectively applied to the contacts 28*a*, 28*b* and 28*c* of the device 29. The device 29, operated at a high sampling frequency of approximately 3.8 megacycles, sequentially samples the color-signal components applied to the contact members 28*a*, 28*b* and 28*c* to produce for each component a train of pulses the amplitude of which is proportional to the intensity of the color-picture element then being scanned by the camera 10. As the switch arm 28*d* continues to rotate, there is produced a succession of these trains of pulses in a predetermined sequence. As these pulses are translated through the network 30, they are converted into sine waves having the frequency of the switching device and having amplitudes modulated in terms of the intensities of the respective color signals. The sine waves may be combined vectorially into a single composite color-signal component or color-wave signal having modulation components related to each of the separate color-signal components. The composite color-signal component is applied to the adder circuit 26, wherein it is combined with the monochrome signal translated through the first channel to form the composite video-frequency signal applied to the modulation-frequency amplifier 18.

In the signal-translating apparatus 17, the sampling-frequency generator 31, which might also be designated as a color wave-signal generator, is controlled by the synchronizing-frequency signals applied thereto from the unit 15 to develop a frequency at which the switching device 29 is operated to sample color-signal components applied thereto in the manner described above. The output signals of the generator 31 are utilized to control the electronic switching rate.

The arrangement just described results in a number of improvements over prior arrangements. By shunting a complete monochrome or brightness signal of 0–4 megacycles through the channel comprising the units 23 and 25, instead of shunting only the mixed-high components of 2–4 megacycles, a simpler transmitter is provided having many advantages. In the improved transmitter, monochrome signals may be transmitted by utilizing only the channel including the units 23 and 25, dispensing with any need for matching the signal gain and cutoff-frequency characteristics of the filters in the color and monochrome channels, thereby providing a transmitter arrangement which is capable of translating improved high-fidelity monochrome signals. In addition, because complete brightness signals are translated through a separate channel, the frequency bands of the color-signals components translated through the color channels may be readily and independently greatly reduced, even to bandwidths as narrow as a few hundred kilocycles. The monochrome signal may be considered as the signal "drawing" the image with a fine brush and the color-signal components utilized to "paint" that image with broad strokes.

*Description of signal-translating system of Fig. 1a*

Referring now to Fig. 1*a* of the drawings, there is represented a signal-translating system 17′ which may be used in place of the unit 17 of Fig. 1. In describing the apparatus of Fig. 1*a* and the circuit elements and components of other figures hereinafter, similar elements and components occurring in the different figures will be designated by similar reference numerals and analogous elements and components by similar reference numerals primed or double primed.

In Fig. 1*a*, the apparatus 17′ includes in the first signal-translating channel a low-pass filter network 25′, preferably proportioned to translate a frequency band of 0–2 megacycles, rather than a band of 0–4 megacycles translated by the network 25 of Fig. 1. The second signal-translating channel comprises low-pass filter networks 27*a*′, 27*b*′ and 27*c*′, each preferably proportioned to pass a frequency band of 0–4 megacycles. The output circuit of unit 17′ includes terminals 32 and 33 for connection to the input circuit of the amplifier 18.

*Operation of signal-translating apparatus of Fig. 1a*

The signal-translating apparatus of Fig. 1*a* operates in a similar to the apparatus 17 of Fig. 1 and, therefore, no complete detailed description of the operation of this apparatus is considered necessary. The apparatus 17′ differs in operation from that of unit 17 of Fig. 1 in that only monochrome-signal components having frequencies of 0–2 megacycles are translated through the first signal-translating channel comprising the units 23 and 25′, while color signals having frequencies between 0 and 4 megacycles are separately translated, in a manner similar to that described in the Fig. 1 embodiment for related signals, through the networks 27*a*′, 27*b*′ and 27*c*′ and are sampled in the device 29. The composite color signal is applied through the terminals 32, 33 to the input circuit of the amplifier 18.

Although in the system 17′ only the monochrome-signal component having frequencies of 0–2 megacycles is translated through the monochrome channel, while the 2–4 megacycle frequencies of this signal are translated through the color channel, the portion of the monochrome signal in which the greatest part of the energy is concentrated passes through the separate channel. Thus, any nonlinear effects in the sampling device have substantially no effect on the monochrome component.

*Description of color-television receiver of Fig. 2*

Referring now to Fig. 2 of the drawings, there is represented a compatible color-television receiver for receiving and translating a modulated wave signal of the type developed and transmitted by the transmitter described above, in particular, for translating a composite video-frequency signal having a monochrome-signal component and a composite color-signal component. These components may be developed from at least two color signals, preferably from two or more of the components of the red, green or blue signals, representative of a picture image being televised. The receiver comprises means for receiving a modulated wave signal modulated by the composite video-frequency signal and for deriving the latter signal therefrom. This means includes a radio-frequency amplifier 40 of any desired number of stages, having its input circuit connected to an antenna system 41, 41 and, coupled in cascade with the output circuit thereof, in the order named, an oscillator-modulator 42, an intermediate-frequency amplifier 43 of one or more stages, and a detector and automatic-gain-control (AGC) supply 44. The receiver also comprises a signal-translating system 45, to be described in more detail hereinafter, and means for utilizing the monochrome component and color signals derived in and translated through the apparatus 45, in particular, an image-reproducing device 46 of the cathode-ray-tube type. The device 46 may be conventional; for example, it may include a complete cathode-ray-tube circuit for each of the primary color signals developed in the system 45 and optical means for combining the images on the cathode-ray tubes into a reproduction of the televised scene. Conventional beam-deflecting windings are associated with each cathode-ray tube.

There is also coupled to the detector 44 a synchronizing-signal separator 47, having output circuits connected with a line-scanning generator 48 and a field-scanning generator 49, the output circuits of these generators in turn being connected with the beam-deflecting windings of the cathode-ray tubes in the image reproducer 46. An output circuit of the separator 47 is also connected to a color wave-signal generator 31′ in the system 45. The output circuit of the (AGC) supply included in the unit 44 is connected to the input circuits of one or more of the tubes of the radio-frequency amplifier 40, the oscillator-modulator 42 and the intermediate-frequency amplifier 43 in a well-known manner. A sound-signal reproducing unit 51 is also connected to the output circuit of the intermediate-frequency amplifier 43 and may have stages of intermediate-frequency amplification, a sound-signal detector, stages of audio-frequency amplification and a sound-reproducing device.

It will be understood that the various units thus far described with respect to the receiver of Fig. 2, with the exception of the signal-translating system 45, may have any conventional construction and design. The details of such components are well known in the art rendering a further description thereof unnecessary.

*Operation of color-television receiver of Fig. 2*

Considering briefly the operation of the receiver of Fig. 2 as a whole and assuming for the moment that the unit 45 is a conventional video-frequency amplifier, a desired modulated television wave signal is intercepted by the antenna system 41, 41. The signal is selected and amplified in the radio-frequency amplifier 40 and applied to the oscillator-modulator 42 wherein it is converted into an intermediate-frequency signal. The intermediate-frequency signal is then selectively amplified in the amplifier 43 and supplied to the detector 44 where its modulation components are derived. These components comprise video-frequency as well as synchronizing-signal components. The video-frequency components are translated through the unit 45 and applied to the control electrodes of the cathode-ray tubes in the unit 46 to modulate the intensity of the electron beam in each tube in accordance with the amplitude variations of the applied signals. The synchronizing-signal components are separated from the video-frequency components in the separator 47 and are used to synchronize the operation of the line-scanning and field-scanning generators 48 and 49, respectively. These generators supply signals of saw-tooth wave form which are properly synchronized with reference to the received television signal and applied to the deflecting means of the cathode-ray tubes in the image reproducer 46, thereby to deflect the cathode-ray beams in two directions normal to each other to reproduce the image being televised at the transmitter.

The automatic-gain-control or (AGC) signal derived in the unit 44 is effective to control the amplification of one or more of the units 40, 42 and 43 to maintain the signal input to the detector 44 and to the sound-signal reproducing unit 51 within a relatively narrow range for a wide range of received signal intensities. The sound-signal modulated carrier wave accompanying the desired television wave signal is concurrently intercepted by the antenna system 41, 41 and, after amplification in the amplifier 40 and conversion to an intermediate-frequency signal in the unit 42, it is translated through the amplifier 43 to the sound-signal reproducing unit 51. In the unit 51 it is amplified and detected to derive the sound-signal modulation components which are further amplified and reproduced by the reproducing device.

*Description of signal-translating system of Fig. 2*

Referring now in particular to the signal-translating system 45 embodying one form of the present invention, since the system 45 is closely related to the system 17 described above, similar components are designated by similar reference characters and analogous components by similar reference characters primed. The system 45 comprises one component of a television receiver, in particular, a compatible color-television receiver which translates a composite video-frequency signal having a monochrome component and a composite color-signal component. In the preferred embodiment, at the transmitter, these components are developed from red, green and blue color signals representative of the color characteristics of an image being televised. In particular, the system 45 comprises a circuit for supplying a first wave signal modulated by a color-television signal or composite video-frequency signal of the type just described and for developing a signal representative of the monochrome signal and a signal representative of the other wave signal. Such circuit includes the pair of input terminals 35, 35 and may also include the input circuit of the detector 44. The system 45 also comprises a first signal-translating channel coupled to the supply circuit and responsive to the composite video-frequency signal applied to a terminal 35 from the detector 44. The first channel includes an isolation amplifier 52 and a 0–4 megacycle low-pass filter network 52*a* in cascade, unit 52 having an input circuit coupled to the terminals 35, 35 and unit 52*a* having output circuits coupled respectively to terminals 53*a*, 53*b* and 52*c*. The units 52 and 52*a* comprise circuit elements so proportioned as to translate the monochrome-representative signal comprising modulation-signal components occupying a predetermined pass band and, more specifically, to translate at least the low-frequency portion, and preferably the frequency band of 0–4 megacycles, of the monochrome component of the composite video-frequency signal applied to the terminals 35, 35.

The signal-translating system 45 also includes a second signal-translating channel coupled to the supply circuit and also responsive to the composite video-frequency signal applied to the terminals 35, 35. The second signal-translating channel includes, in cascade, a band-pass filter network 30′, proportioned to translate the frequency band of 2–4 megacycles, an adjustable-gain amplifier 36 having a gain-control device, a number of parallel-connected synchronous detectors 29*a*′, 29*b*′ and 29*c*′, and low-pass filter networks 27*a*′, 27*b*′ and 27*c*′ having input circuits respectively coupled to the output circuits of the units 29*a*′, 29*b*′ and 29*c*′ and output circuits respectively coupled to terminals 53*a*, 53*b* and 53*c*.

In order to diminish to a minimum the possibility of cross talk between components of the monochrome signal and the sampling signal, the network 30′ may have nonuniform signal-translating characteristics, being peaked to translate only signals having frequencies in the vicinity of that of the sampling signal.

Each of the synchronous detectors 29a′, 29b′ and 29c′, which will be more fully described hereinafter with reference to Fig. 3, may be defined as a device which derives the modulation components of an applied wave signal by utilizing a locally generated wave signal which is in synchronism with and at a predetermined phase with respect to the applied wave signal. These detectors comprise means for cyclically sampling the composite color-signal component translated through the unit 30′ to derive therefrom at least one signal related to a color characteristic of the image, and, in the preferred embodiment, to derive signals related to each of the red, green and blue characteristics of the image. The filter networks 27a′, 27b′ and 27c′ comprise a plurality of low-pass filter networks, proportioned to pass frequency bands of the order of, or less than, 2 megacycles, for separately translating each of the signals derived in respective ones of the detectors 29a′, 29b′ and 29c′. The units 30′, 36, 29a′–29c′, inclusive, and 27a′–27c′, inclusive, are arranged to translate the signals derived in the output circuits of the units 27a′, 27b′, and 27c′ while discriminating against signals representative of the monochrome signal, and the derived signals comprise modulation-signal components having band widths of 0–2 megacycles and occupying a band overlapping the 0–4 megacycle pass band of the filter network 52a for translating the monochrome signal. The terminals 53a, 53b and 53c comprise output circuit means coupled to the first and second channels, specifically to the amplifier 52 on the one hand and the networks 27a′, 27b′, and 27c′ on the other, for supplying the translated monochrome-representative signal and the derived color-characteristic signal and comprise, in particular, a group of signal-coupling circuits, for combining the monochrome component translated through the first channel, including the isolation amplifier 52, with each of the derived signals translated through the second channel, including the units 30′, 29a′, 29b′, 29c′, 27a′, 27b′ and 27c′, to form red, green and blue color signals suitable for use for the reproduction of the color characteristics of the televised image.

The signal-translating system 45 also includes a color wave-signal generator 31′ coupled between the unit 47 and the synchronous detectors 29a′, 29b′ and 29c′ to supply a signal thereto synchronously to control the operation thereof.

The term "modulation-signal components" as used hereinbefore is not intended to be limited to the 0–2 megacycle derived color components as translated through the units 27a′–27c′, inclusive, or the derived 0–4 megacycle signal translated through the network 52a but rather is intended to be broader in meaning applying not only to the signals just mentioned which have been derived from wave signals but also applying to such signals as they appear as modulation signals or components of wave signals from which they are eventually derived. It is to be understood that as modulation components of wave signals the relative band widths and spectral relations of the monochrome and color-signal components correspond to the relations of such signals after derivation as more fully discussed hereinafter.

*Operation of signal-translating system of Fig. 2*

The signal-translating system 45 operates in a manner similar to that of the related system 17 of Fig. 1, except in inverse order, to derive the color signals from the composite video-frequency signal. The composite video-frequency signal derived in the detector 44 is applied to the terminals 35, 35 of the unit 45. Signals within the frequency band 0–4 megacycles, in particular, the monochrome signals, are translated through the isolation amplifier 52 from which similar but separate output signals, each including frequencies up to 4 megacycles, are applied to the terminals 53a, 53b and 53c. For the purpose of developing color images in the image reproducer 46, that portion of the composite video-frequency signal applied to the terminals 35, 35 within the frequency band 2–4 megacycles, being in particular a composite color-signal component, is also translated through the band-pass filter 30′ and the amplifier 36, wherein the gain may be varied to control the saturation of the colors in the reproduced image, and applied to the detectors 29a′, 29b′ and 29c′. These detectors cyclically measure or sample the amplitude of the composite color-signal component synchronously, under control of generator 31′, producing separate pulses of signals related to the primary color signals red, green and blue in proper synchronization with the generation of similar pulses at the transmitter. The 0–2 megacycle frequency bands comprising these pulses are then separately translated through the low-pass filter networks 27a′, 27b′ and 27c′ and applied, respectively, to the terminals 53a, 53b and 53c. The derived signals appearing on these terminals are separately combined with the monochrome signals translated through the first channel, including the isolation amplifier 52, to provide primary color signals of improved resolution, which are separately applied to individual cathode-ray tubes to produce the different primary color images corresponding to those present in the corresponding camera tube at the transmitter. These images are then optically combined in a conventional manner to produce the televised scene in the television receiver.

The above description applies to the reception and reproduction of color images in the television receiver. If it is desired to reproduce only black-and-white images, regardless of whether black-and-white signals or color signals are being transmitted, then it is only necessary to disable or disconnect detectors 29a′, 29b′ and 29c′, thereby preventing the translation of any signals through the second channel. In such a manner complete monochrome signals will be translated through the first channel and applied to the individual cathode-ray tubes in the image reproducer 46, the optical apparatus of which will effect a combination of the images present on the screens of the several tubes to reproduce a black-and-white picture.

The arrangement of Fig. 2 offers many improvements over prior arrangements. Monochrome or color images may be reproduced with equal fidelity and facility. To reproduce the monochrome images there is no need to match the signal gain and cutoff-frequency characteristics of the networks 27a′, 27b′, 27c′ and of the filter network 52a. Because complete signals are translated through the amplifier 52, color-signal components having bandwidths as narrow as a few hundred kilocycles may be utilized to effect a color "painting" of the monochrome images as described above. In addition, if narrow band color channels are utilized, including narrow band filter networks, the gain of the stages translating the derived color-signal components is increased, thus minimizing the number of amplifying stages required. Another very important advantage of the receiver of Fig. 2 arises from use of the band-pass filter network 30′, thereby permitting the application of only the composite color-signal component, instead of the composite video-frequency signal, to the detectors 29a′, 29b′, and 29c′. With such an arrangement, the signal level at the detector is controlled only by the level of the composite color-signal component. Therefore, direct-current reinserter arrangements are not needed in advance of the synchronous detectors. Also, by controlling the gain of the amplifier 36, a convenient means for controlling the saturation of the reproduced color image is provided.

By translating the monochrome signal through a channel shunted around the channels including the synchronous detectors, it is not necessary to use narrow pulse-type sampling or detection in order to obtain saturated colors. It is, therefore, possible to utilize wide pulse-type sampling, proportioned to provide the maximum detection efficiency. In this way, very large signal gain may be achieved in the detector stages, further minimizing the number of amplifying stages needed in the receiver. Also, as has been previously mentioned with respect to other embodiments, by using the shunted monochrome-channel arrangement, any nonlinearity of the detector stages does not affect the linearity of the monochrome signal.

*Description of modified signal-translating system of Fig. 2a*

Referring now to Fig. 2*a*, there is represented a modified signal-translating system 45′ which may be used in place of the unit 45 of Fig. 2. Since the units 45′ and 45 are similar, no detailed description of unit 45′ will be presented. Briefly, the system 45′ comprises in the first signal-translating channel a low-pass filter network 25′ connected in series with the isolation amplifier 52′. The network 25′ is proportioned to translate at least those frequencies of the monochrome component in the 0–2 megacycle band. The second signal-translating channel of the system 45′ comprises the band-pass filter 30′, the amplifier 36 and the detectors **29*a*′, 29*b*′ and 29*c*′ coupled between the terminals 35, 35 and the output terminals 53*a*, 53*b* and 53*c*. The system 45′ also includes the color wave-signal generator 31′, to be connected through the terminal 32*a* to the synchronizing-signal separator 47**.

*Operation of signal-translating apparatus of Fig. 2a*

In general, unit 45′ operates in a manner similar to the operation of unit 45. It differs in that, in unit 45′, only monochrome signals with the frequency band of 0–2 megacycles are translated through the first signal-translating system and applied to the output terminals **53*a*, 53*b* and 53*c*, while the absence of low-pass filter networks in the output circuits of the detectors 29*a*′, 29*b*′ and 29*c*′ permits color-signal components within the frequency band 0–4 megacycles to be applied to the terminals 53*a*, 53*b* and 53*c*, the 2–4 megacycle brightness-signal components being thereby provided. As in unit 45, the signals translated through the first and second channels are combined at the terminals 53*a*, 53*b* and 53*c* to provide the color signals to be applied to the individual cathode-ray tubes in the image reproducer 46**.

Although the unit 45′ does not have all of the advantages described with reference to the unit 45 of Fig. 2, it is a much simpler and less expensive system, achieving a number of improved results. In the unit of Fig. 2*a*, wide band color-signal components are utilized and at least a portion of the monochrome component is translated through the color channels. Therefore, while the signal gain and cutoff-frequency characteristics of the networks 30′ and 25′ should be matched, in prior systems four such filter networks were required to be matched.

*Description of signal-translating system of Fig. 3*

Referring now to Fig. 3, there is represented a schematic diagram of a circuit arrangement of a color-television receiver including a signal-translating system 45″ of the type represented by circuit diagrams in units 45 and 45′ of Figs. 2 and 2*a* and of an image reproducer 46″ similar to that represented by unit 46 in Fig. 2.

Unit 45″ comprises a signal-translating system in a compatible color-television receiver for translating a plurality of composite video-frequency signal components representative of an image, at least one of which is a monochrome-signal component and another of which is a composite color-signal component, the latter components preferably developed from the red, green and blue color signals representative of the coloring of the image. In particular, system 45″ comprises a first signal-translating channel responsive to the composite video-frequency signal. This first channel includes a video-frequency amplifier comprising a vacuum tube 54 with an anode-cathode output circuit including a time-delay network 55 so proportioned as to translate signals preferably having a band width of 0–4 megacycles but at least including that portion of the monochrome component within the frequency band 0–2 megacycles. The first channel also includes a rejection filter network or trap 56 for rejecting undesired signal frequencies, particularly, the sampling signal or color-wave signal, and group of parallel-connected voltage-dividing resistors **60*a*, 60*b* and 60*c*. The vacuum tube 54 also has an input circuit including a contrast-control voltage divider 57, coupled to the input terminals 35, 35 and having an adjustable tap coupled to the control electrode thereof, and a cathode-biasing network comprising a parallel-connected resistor 58 and a condenser 59. A source of potential +B is applied to the anode of the tube 54 through its load circuit including networks 55 and 56, the resistors 60*a*, 60*b* and 60*c*, in parallel, and a resistor 61 in series with an inductor 62. The output circuit of the tube 54 is also connected through a series-connected resistor 63 and a condenser 64 to a band-pass filter 30″ in the input circuit of the second signal-translating channel. The filter 30″ comprises coupled tuned circuits 67, 68 and 69, 70** proportioned to have a pass band of 2.8–4 megacycles or even less.

The system 45″ also comprises a second signal-translating channel coupled in circuit with the first channel and responsive to the composite video-frequency signal applied to the terminals 35, 35 and translated through the tube 54 and the coupling circuit 63, 64. The second signal-translating channel includes the band-pass filter network 30″, a plurality of synchronous detectors including vacuum-tube repeaters **65*a*, 65*b* and 65*c*, which comprise means for deriving from a composite color-signal component applied thereto signals related to each of the primary color signals red, green and blue, and a plurality of low-pass filter networks 66*a*, 66*b* and 66*c*** for individually translating the derived signals, preferably only those signals within the frequency band 0–1 megacycle.

Since, in the embodiment under consideration, the composite color-signal component to be translated through and sampled in the second channel is of a type having a fixed number of primary color signals for any televised image, the plurality of modulators and low-pass filter networks referred to may be similarly constructed and individually provide a modulator and low-pass filter network for each of the primary color signals. Therefore, a detailed description is presented for only one of these channels but like components of each channel are identified by similar or related reference characters. There may be one exception to the similarity of components, if very narrow band color-signal components are translated through the separate color channels. In order to take the utmost advantage of the variations in the sensitivity of the eye to the colors green, red and blue and to obtain the minimum total bandwith for all of the color signals, pass bands of 0.5 megacycle may be utilized for the green and red channels and a pass band of the order of 0.1 megacycle utilized for the blue channel.

The filter 30″ is coupled to one of the control electrodes of tube **65*a* through a coupling condenser 70*a* provided with a grid-leak resistor 71*a* returned to a cathode-biasing circuit 72*a*, 73*a*. A source of potential +B is connected to the anode of tube 65*a* through an inductor 74*a* and a load resistor 75*a*, while the low-pass filter network 66*a*, including a series-connected inductor 76*a* and a condenser 77*a* is connected between the anode thereof and the terminal 53*a*′**.

System 45″ also comprises means, in particular the color wave-signal generator 31′, for sequentially applying to the detectors, and particularly to tubes **65*a*, 65*b* and 65*c***, a three-phase sampling potential to cause the detectors to sample the composite color-signal component simultaneously applied to the input circuits thereof.

The circuit arrangement of Fig. 3 also comprises image reproducer 46'' coupled to system 45'' and including a plurality of cathode-ray tubes 78*a*, 78*b* and 78*c* each having cathode and control electrodes and other conventional electrodes. Reproducer 46'' comprises means for applying the monochrome component translated through the first channel of system 45'' to one of the electrodes in each of the cathode-ray tubes, including leads 79*a*, 79*b* and 79*c* and coupling condensers 80*a*, 80*b* and 80*c* respectively connected between the resistors 60*a*, 60*b* and 60*c* and the individual cathodes of the cathode-ray tubes 78*a*, 78*b* and 78*c*. The last-mentioned means also includes leads 81*a*, 81*b* and 81*c*, respectively, connected between the terminals 53*a*', 53*b*' and 53*c*' and the control electrodes of the cathode-ray tubes 78*a*, 78*b* and 78*c* for applying derived signals related to the color-signal components in the second channel individually to the other of the electrodes of the cathode-ray tubes to produce red, green and blue control effects thereon thereby to effect a reproduction of the red, green and blue coloring of the televised image in the several cathode-ray tubes.

Unit 46'' also comprises conventional direct-current restoration networks, including a diode 82*a*, connected between the grid and cathode of cathode-ray tube 78*a* through a blocking condenser 100*a* and through a resistor 84*a* to a source of positive potential, such as a voltage divider 83. A load resistor 85*a* is connected between the cathode and anode of diode 82*a*. Resitors 86*a* and 87*a* connected in the cathode circuit of the tube 78*a* provide a source of bias potential therefor.

*Operation of the circuit arrangement of Fig. 3*

The arrangement of Fig. 3 operates in a manner very similar to that of units 45 and 46 of Fig. 2. Briefly, the composite video-frequency signals derived in the detector 44 of Fig. 2 are applied to the terminals 35, 35 in Fig. 3 and are translated through the amplifier including the tube 54. The monochrome component appearing in the output circuit of the tube 54 is then translated through the time-delay network 55, proportioned to compensate for any difference in translation time in the first and second channels, applied to the trap circuit 56, wherein the sampling frequency of approximately 3.8 megacycles is greatly attenuated, and through the signal-equalizing resistors 60*a*, 60*b* and 60*c* to the output terminals 101*a*, 101*b* and 101*c* of the first channel. The signals at these terminals are then indivdually translated through the condensers 80*a*, 80*b* and 80*c* for application to the individual cathodes of tubes 78*a*, 78*b* and 78*c*. There is thus applied to the cathodes of the cathode-ray tubes signals having a full range of frequencies suitable for the complete reproduction of monochrome or black-and-white images, even though color-television signals are being received.

For the purpose of developing color images in the color-sensitive cathode-ray tubes 78*a*, 78*b* and 78*c* or for "painting" the monochrome image in color, the composite video-frequency signal in the output circuit of the tube 54 is also translated through the resistor 63 and the condenser 64 to network 30'' in the input circuit of the second signal-translating channel. Because of the fact that a complete monochrome signal is translated through the first translating channel, the network 30'' need translate only a desired portion of the total composite color signal, for example, those signals within the frequency band 2.8–4 megacycles. These signals are individually simultaneously applied through the coupling condensers 70*a*, 70*b* and 70*c* to corresponding control electrodes of the tubes 65*a*, 65*b* and 65*c*. A signal developed by the generator 31', in synchronism and phase with a related color signal at the transmitter, sequentially controls the detection action of the tubes 65*a*, 65*b* and 65*c* by applying to these tubes in proper phase relationship a triggering signal permitting the tubes to sample the proper color signals and to reject all others. As the tube 65*a* conducts, green color signals are derived from the composite color-signal component applied thereto and signals having any desired bandwidth, for example, less than 1 megacycle, are translated through the low-pass filter network 66*a* to be applied to the terminal 53*a*'. The green color signal on terminal 53*a*' is then translated over the lead 81*a* and applied to the cathode-ray tube 78*a* to modulate the control electrode thereof, thereby to develop on the screen of the tube 78*a* a green color picture similar to that present in the green color camera at the transmitter. In a similar manner a red color picture is developed on the screen of cathode-ray tube 78*b* and a blue color picture on the screen of the cathode-ray tube 78*c*. When these color pictures, containing the primary colors, are optically combined in the manner previously described, a color picture of the type being televised is reproduced at the receiver.

The signal-translating apparatus just described has a number of important operational advantages. If the modulator tubes 65*a*, 65*b* and 65*c* are disconnected or controlled to be nonconductive, the second signal-translating channel translates no signals to the cathode-ray tubes. Since the signal translated through the first signal-translating channel is a complete monochrome signal simultaneously applied to the cathodes of each of the cathode-ray tubes, similar images having the colors of green, red and blue are reproduced on the respective screens of the cathode-ray tubes and are of such relative intensities that, when optically combined, they reproduce a monochrome signal. Thus, monochrome reproduction may be obtained simply and efficiently. In addition, since networks 30'', 66*a*, 66*b* and 66*c* may have very narrow bandwidths and the detectors may be operated for optimum detection by detecting only in phase with the proper signal, increased gain in the signals translated therethrough may be obtained, thereby reducing the number of amplifying stages required. There is an added advantage in translating the complete monochrome signal through the first channel and using narrow band filters in the second channel in that any difference in the gain or linearity of the three channels of the second channel will not affect the color balance of the whites or grays in the cathode-ray tubes. Additionally, by utilizing a shunt path for the monochrome signal, the problem of nonlinearity of the synchronous detectors affecting the linearity of the monochrome signal is eliminated.

The present invention has been described in a system of compatible color transmission and reception, presenting arrangements of transmitters and receivers to effect this result. It is to be understood that the transmitters and receivers so described individually may be used in conjunction with other transmitters and receivers utilizing similar line, field and sampling frequencies, although employing different types of signal-translating channels capable of translating signals having frequency ranges different than those described herein. When so used, the receivers and transmitters described herein will still retain the advantages mentioned above and will provide compatible arrangements superior to those now available.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. In a color-television receiver for translating a composite video-frequency signal representative of a color image and having as components a monochrome signal and a subcarrier-wave signal modulated in amplitude and phase by color-signal components, a signal-translating system comprising: a circuit for supplying a composite video-frequency signal of the type described; a first signal-translating channel coupled to said supply circuit and including a network having a predetermined pass band for translating at least the low-frequency component of said monochrome signal; a second signal-translating channel coupled to said supply circuit and including means for translating said subcarrier wave signal and for deriving therefrom at least one signal representative of a color characteristic of said image and for translating said derived signal, said second channel discriminating against signals representative of said low-frequency component of said monochrome signal, said translated derived signal occupying a band overlapping said predetermined pass band; and output circuit means coupled to said first and second channels for supplying said translated monochrome-signal component and said derived signal.

2. In a color-television receiver for translating a composite video-frequency signal representative of a color image and having as components a monochrome signal and a subcarrier wave signal modulated in amplitude and phase by color-signal components, a signal-translating system comprising: a circuit for supplying a composite video-frequency signal of the type described; a first signal-translating channel coupled to said supply circuit and including a network for translating at least the 0–2 megacycle low-frequency component of said monochrome signal; a second signal-translating channel coupled to said supply circuit and including a band-pass filter network having a pass band with a lower cutoff frequency between 1 and 3 megacycles for selecting said subcarrier-wave signal and means for deriving therefrom at least one signal representative of a color characteristic of said image, said derived signal having a maximum frequency not substantially greater than said lower cutoff frequency; and output circuit means coupled to said first and second channels for supplying said translated monochrome-signal component and said derived signal.

3. In a color-television receiver for translating a composite video-frequency signal representative of a color image and having as components a monochrome signal and a subcarrier wave signal modulated by signals representative of at least two predetermined color characteristics of the image, a signal-translating system comprising: a circuit for supplying a composite video-frequency signal of the type described; a first signal-translating channel coupled to said supply circuit for translating said monochrome signal; a second signal-translating channel coupled to said supply circuit signal and including a band-pass filter network having a low-frequency cutoff of substantially 2 megacycles for selecting therefrom said subcarrier-wave signal and means for deriving from said wave signal signals related to each of said two predetermined color characteristics and a plurality of 0–2 megacycle low-pass filter networks for separately translating each of said derived signals; and means for effectively combining said monochrome component translated through said first channel with each of said derived signals translated through said second channel to produce desired color signals.

4. In a color-television receiver for translating a composite video-frequency signal representative of a color image and having as components a monochrome signal and a subcarrier wave signal modulated by signals representative of at least two predetermined color characteristics of the image, a signal-translating system comprising: a circuit for supplying a composite video-frequency signal of the type described; a first signal-translating channel coupled to said supply circuit, and including circuit elements so proportioned as to translate at least the 0–2 megacycle frequency component of said monochrome signal; a second signal-translating channel coupled to said supply circuit and including a band-pass filter having a pass band with a lower cut-off frequency between 1 and 3 megacycles for selecting said subcarrier-wave signal, a plurality of synchronous detectors for deriving from said wave signal signals related to each of said two predetermined color characteristics and a plurality of low-pass filter networks each having an upper cutoff frequency not substantially greater than said lower cutoff frequency for separately translating each of said derived signals; and means for effectively combining said monochrome component translated through said first channel with each of said derived signals translated through said second channel to produce desired color signals.

5. In a color-television receiver for translating a composite video-frequency signal representative of a color image and having as components a monochrome signal and a subcarrier wave signal modulated by signals representative of the green, red and blue color characteristics of the image, a signal-translating system comprising: a circuit for supplying a composite video-frequency signal of the type described; a first signal-translating channel coupled to said supply circuit, and including a network for translating at least the 0–2 megacycle component of said monochrome signal; a second signal-translating channel coupled to said supply circuit and including a band-pass filter network having a pass band with a lower cutoff frequency between 1 and 3 megacycles for selecting said subcarrier-wave signal, means including a generator for developing a wave signal synchronized with said subcarrier wave signal for deriving from said wave signal signals related to each of said green, red and blue color characteristics and a plurality of low-pass filter networks each having an upper cutoff frequency not substantially greater than said lower cutoff frequency for separately translating each of said derived signals; and means for effectively combining said monochrome component translated through said first channel with each of said derived signals translated through said second channel to produce desired color signals.

6. In a color-television receiver for translating a composite video-frequency signal representative of a color image and having as components a monochrome signal and a subcarrier wave signal modulated by signals representative of the green, red and blue color characteristics of the image, a signal-translating system comprising: a circuit for supplying a composite video-frequency signal of the type described; a first signal-translating channel coupled to said supply circuit and including a network for translating at least the 0–2 megacycle component of said monochrome signal; a second signal-translating channel coupled to said supply circuit and including a band-pass filter network having a pass band with a lower cutoff frequency between 1 and 3 megacycles for selecting said subcarrier-wave signal, means for deriving from said wave signal signals related to each of said green, red and blue color characteristics and a plurality of low-pass filter networks individually having different pass bands at least one of which has an upper cutoff frequency between 0.5 and 2 megacycles for separately translating different frequency bands of each of said derived signals; and means for effectively combining said monochrome component translated through said first channel which each of said derived signals translated through said second channel to produce desired color signals.

7. A color-television transmitter for translating and transmitting a composite video-frequency signal comprising: means for developing a first carrier-wave signal; means for generating color signals and for selecting color-signal components therefrom; means for developing a composite video-frequency signal including a first signal-translating channel for developing a monochrome signal from said color signals and having a network with a predetermined pass band for translating at least the low-frequency component of said monochrome signal said low-frequency component comprising a substantial band of frequencies below a predetermined frequency, signal-generating means for developing another wave signal, a second signal-translating channel for translating at least two of said color-signal components having a maximum frequency higher than said predetermined frequency and coupled to said signal-generating means for effectively multiplex-modulating said other wave signal by said translated color-signal components to develop a composite color-signal component, said second channel being effective selectively to translate said composite color-signal component, and a circuit for combining said translated monochrome component and said developed composite color-signal component to form said composite video-frequency signal; and means for modulating said first wave signal with said composite video-frequency signal and for transmitting said modulated wave signal.

8. In a color-television receiver for translating a first wave signal modulated by a color-television signal representative of a color image, the color-television signal having as components a monochrome signal and another wave signal modulated by color-signal components representative of the difference between said monochrome signal and individual color signals representative of the color of said image, a signal-translating system comprising: a circuit for supplying a signal representative of the monochrome signal and a signal representative of the modulated other wave signal; a first channel coupled to said supply circuit and having circuit elements proportioned to translate said monochrome-representative signal comprising modulation-signal components occupying a predetermined frequency band; a second channel coupled to said supply circuit and including a modulator arrangement for deriving from said signal representative of the modulated other wave signal at least one signal representative of a color characteristic of the image and for translating said derived signal, said second channel discriminating against signals representative of the low-frequency component of the monochrome signal, said translated derived signal comprising modulation-signal components occupying a band overlapping said predetermined frequency band; and output circuit means coupled to said first and second channels for supplying said translated monochrome-representative signal and said derived color-characteristic signal.

9. In a color-television receiver for translating a wave signal modulated by a monochrome signal and a subcarrier wave signal having amplitude and phase characteristics representative of the saturation and hue of the colors of a color image, a signal-translating system comprising: a circuit for supplying a wave signal of the type described and for developing a signal representative of the monochrome signal and a signal representative of the subcarrier wave signal; a first channel coupled to said supply circuit and having circuit elements proportioned to translate said monochrome-representative signal comprising modulation-signal components occupying a predetermined frequency band; a second channel coupled to said supply circuit and including a plurality of synchronous detector circuit means for deriving from said signal representative of the subcarrier wave signal a plurality of signals representative of the color characteristics of the image and for separately translating said derived signals, said second channel discriminating against signals representative of the low-frequency component of the monochrome signal, at least one of said translated derived signals occupying a band overlapping said predetermined frequency band; and output circuit means coupled to said first and second channels for supplying said translated monochrome-representative signal and each of said derived color-characteristic signals.

10. In a color-television receiver for translating a first wave signal modulated by a composite video-frequency signal representative of a color image and having as components a monochrome signal and a subcarrier wave signal modulated by color-signal components representative of the difference between said monochrome signal and individual color signals representative of the color of said image, a signal-translating system comprising: a circuit for supplying a first wave signal of the type described and for developing a signal representative of the monochrome signal and a signal representative of the subcarrier wave signal; a first channel coupled to said supply circuit and having circuit elements proportioned to translate said monochrome-representative signal comprising modulation-signal components occupying a predetermined frequency band; a second channel coupled to said supply circuit and including a detector arrangement for deriving from said signal representative of the subcarrier wave signal at least one signal representative of a color characteristic of the image and for translating said derived signal, said second channel discriminating against signals representative of the low-frequency component of the monochrome signal, said translated derived signal occupying a band overlapping said predetermined frequency band; and output circuit means coupled to said first and second channels for supplying said translated monochrome-representative signal and said derived color-characteristic signal.

11. In a color-television receiver for translating a first wave signal modulated by a composite video-frequency signal representative of a color image and having as components a monochrome signal and a subcarrier wave signal modulated by color-signal components representative of the difference between said monochrome signal and individual color signals representative of the color of said image, a signal-translating system comprising: a circuit for supplying a first wave signal of the type described and for developing a signal representative of the monochrome signal and a signal representative of the subcarrier wave signal; a first channel coupled to said supply circuit and having a predetermined pass band for translating said monochrome-representative signal; a second channel coupled to said supply circuit and including a detector arrangement for deriving from said signal representative of the subcarrier wave signal at least one signal representative of a color characteristic of the image and having a plurality of cascaded filter networks having different pass bands for translating said derived signal while discriminating against signals representative of the monochrome signal, said translated derived signal occupying a band overlapping said predetermined pass band; and output circuit means coupled to said first and second channels for supplying said translated monochrome-representative signal and said derived color-characteristic signal.

12. In a color-television receiver for translating a first wave signal modulated by a composite video-frequency signal representative of a color image and having as components a monochrome signal and a subcarrier wave signal modulated by color-signal components representative of the difference between said monochrome signal and individual color signals representative of the color of said image, a signal-translating system comprising: a circuit for supplying a first wave signal of the type described and for developing a signal representative of the monochrome signal and a signal representative of the subcarrier wave signal; a first channel coupled to said supply circuit for translating said monochrome-representative signal; a second channel coupled to said supply circuit having a pass band for translating said signal representative of the subcarrier wave signal with at least one side band thereof and including a detector arrangement for deriving therefrom at least one signal representative of a color characteristic of the image and for translating said derived signal, said second channel discriminating against signals representative of the monochrome signal, said translated derived signal having a maximum frequency not substantially greater than the low-frequency cutoff of said pass band; and output circuit means coupled to said first and second channels for supplying said translated monochrome-representative signal and said derived color-characteristic signal.

13. In a color-television receiver for translating a first wave signal modulated by a composite video-frequency signal representative of a color image and having as components a monochrome signal and a subcarrier wave signal modulated by color-signal components representative of the difference between said monochrome signal and individual color signals representative of the color of said image, a signal-translating system comprising: a circuit for supplying a first wave signal of the type described and for developing a signal representative of the monochrome signal and a signal representative of the subcarrier wave signal; a first channel coupled to said supply circuit and having a pass band with a low-frequency cutoff of less than 0.1 megacycle for translating said monochrome-representative signal; a second channel coupled to said supply circuit and including a detector arrangement for deriving from said signal representative of the subcarrier wave signal at least one signal representative of a color characteristic of the image, said second channel having a pass band with a high-frequency cutoff of at least 0.1 megacycle for translating said derived signal and said second channel discriminating against signals representative of the monochrome signal; and output circuit means coupled to said first and second channels for supplying said translated monochrome-representative signal and said derived color-characteristic signal.

14. In a color-television receiver for translating a first wave signal modulated by a composite video-frequency signal representative of a color image and having as components a monochrome signal and a subcarrier wave signal modulated by color-signal components representative of the difference between said monochrome signal and individual color signals representative of the color of said image, a signal-translating system comprising: a circuit for supplying a first wave signal of the type described and for developing a signal representative of the monochrome signal and a signal representative of the subcarrier wave signal; a first channel coupled to said supply circuit and having a predetermined pass band for translating said monochrome-representative signal; a second channel coupled to said supply circuit having a band-pass filter network for translating said signal representative of the subcarrier wave signal and including a detector arrangement for deriving therefrom signals representative of color characteristics of the image and a plurality of low-pass filter networks having pass bands at least one of which has a high-frequency cutoff higher than the low-frequency cutoff of said predetermined pass band and less than the low-frequency cutoff of said band-pass filter network for separately translating frequency bands of said derived signals, said second channel discriminating against signals representative of the monochrome signal; and output circuit means coupled to said first and second channels for supplying said translated monochrome-representative signal and said derived color-characteristic signal.

15. In a color-television receiver for translating a composite video-frequency signal representative of a color image and having as components a monochrome signal and a subcarrier wave signal modulated by color-signal components, a signal-translating system comprising: a circuit for supplying a composite video-frequency signal of the type described; a first channel coupled to said supply circuit and having a filter network with at least a 0–2 megacycle pass band for translating said monochrome signal; a second channel coupled to said supply circuit having approximately a 2–4 megacycle filter network for translating said other wave signal and including a detector arrangement for deriving therefrom a plurality of signals representative of different color characteristics of the image and a plurality of low-pass filter networks having pass bands with high-frequency cutoffs of not more than 2 megacycles for translating said derived signals, said second channel discriminating against signals representative of the monochrome signal; and output circuit means coupled to said first and second channels for supplying said translated monochrome-representative signal and said derived color-characteristic signals.

16. In a color-television receiver for translating a first wave signal modulated by a color-television signal representative of a color image, the color-television signal having as components a monochrome signal and another wave signal modulated by color-signal components representative of the difference between said monochrome signal and individual color signals representative of the color of said image, a signal-translating system comprising: a circuit for supplying a first wave signal of the type described and for developing a signal representative of the monochrome signal and a signal representative of the modulated other wave signal; a first channel coupled to said supply circuit and having a predetermined pass band for translating said monochrome-representative signal; a second channel coupled to said supply circuit having another pass band for translating said signal representative of the modulated other wave signal with at least one side band thereof and including a modulator arrangement for deriving therefrom at least one signal representative of a color characteristic of the image and for translating said derived signal, said second channel discriminating against signals representative of the monochrome signal, said other pass band and the band occupied by modulation-signal components of said translated derived signal overlapping said predetermined pass band; and output circuit means coupled to said first and second channels for supplying said translated monochrome-representative signal and said derived color-characteristic signal.

17. In a color-television receiver for translating a first wave signal modulated by a color-television signal representative of a color image, the color-television signal having as components a monochrome signal and another wave signal modulated by color-signal components representative of the difference between said monochrome signal and individual color signals representative of the color of said image, a signal-translating system comprising: a circuit for supplying a first wave signal of the type described and for developing a signal representative of the monochrome signal and a signal representative of the modulated other wave signal; a first channel coupled to said supply circuit and having a predetermined pass band for translating said monochrome-representative signal; a second channel coupled to said supply circuit having a band-pass filter network for translating said signal representative of the modulated other wave signal and including a detector arrangement for deriving therefrom at least one signal representative of a color characteristic of the image and a low-pass filter network having a high-frequency cutoff higher than the low-frequency cutoff of said predetermined pass band and not substantially greater than the low-frequency cutoff of said band-pass filter network for translating said derived signal, said second channel discriminating against signals representative of the monochrome signal; and output circuit means coupled to said first and second channels for supplying said translated monochrome-representative signal and said derived color-characteristic signal.

18. In a color-television receiver for translating a composite video-frequency signal representative of a color image, the color-television signal having as components a monochrome signal and a subcarrier wave signal modulated by signals representative of the difference between said monochrome signal and individual color signals representative of the color of said image, a signal-translating system comprising: a circuit for supplying a composite video-frequency signal of the type described; a first signal-translating channel coupled to said supply circuit for translating said monochrome signal; a second signal-translating channel coupled to said supply circuit and including in cascade a band-pass filter network for selecting said subcarrier wave signal, means for deriving from said wave signal signals related to each of two predetermined color characteristics of said image, and a plurality of low-pass filter networks for separately translating each of said derived signals, the pass bands of said band-pass and low-pass filter networks being mutually exclusive; and means for effectively combining said monochrome signal translated through said first channel with each of said derived signals translated through said second channel effectively to produce desired color signals.

19. In a color-television receiver for translating a composite video-frequency signal representative of a color image and having as components a monochrome signal and a subcarrier wave signal modulated by signals representative of the color characteristics of the image, a signal-translating system comprising: a circuit for supplying a composite video-frequency signal of the type described; a first signal-translating channel coupled to said supply circuit and including a network for translating at least the 0–2 megacycle component of said monochrome signal; a second signal-translating channel coupled to said supply circuit and including in cascade a band-pass filter network having a pass band with a low-frequency cutoff between 1 and 3 megacycles for selecting said subcarrier wave signal, means including a generator for developing a wave signal synchronized with said subcarrier wave signal for deriving from said subcarrier wave signal signals related to each of said color characteristics, and a plurality of low-pass filter networks each having a high-frequency cutoff not substantially greater than said low-frequency cutoff for separately translating each of said derived signals; and means for effectively combining said monochrome component translated through said first channel with each of said derived signals translated through said second channel effectively to produce desired color signals.

20. In a color-television receiver for translating a composite video-frequency signal representative of a color image and having as components a monochrome signal and a subcarrier wave signal modulated by signals representative of the color characteristics of the image, a signal-translating system comprising: a circuit for supplying a composite video-frequency signal of the type described; a first signal-translating channel coupled to said supply circuit and including a network for translating at least the 0–2 megacycle component of said monochrome signal; a second signal-translating channel coupled to said supply circuit and including in cascade a band-pass filter network having a pass band with a low-frequency cutoff between 1 and 3 megacycles for selecting said subcarrier wave signal, means for deriving from said wave signal signals related to each of said color characteristics and a plurality of low-pass filter networks individually having pass bands at least one of which has a high-frequency cutoff between 0.5 and 2 megacycles for separately translating frequency bands of each of said derived signals; and means for effectively combining said monochrome component translated through said first channel with each of said derived signals translated through said second channel effectively to produce desired color signals.

21. A color-television transmitter for translating and transmitting a composite video-frequency signal comprising: means for developing a first carrier-wave signal; means for generating color signals and for selecting color-signal components therefrom; means for developing a composite video-frequency signal including a first signal-translating channel for developing a monochrome signal from said color signals and having a filter network for translating at least the 0–2 megacycle low-frequency component of said monochrome signal, signal-generating means for developing another wave signal, a second signal-translating channel for translating at least two of said color-signal components and coupled to said signal-generating means for effectively multiplex-modulating said other wave signal by said translated color-signal component to develop a composite color-signal component, said second channel including a filter network having approximately a 2–4 megacycle pass band for selectively translating said composite color-signal component, and a circuit for combining said translated monochrome component and said developed composite color-signal component to form said composite video-frequency signal; and means for modulating said first wave signal with said composite video-frequency signal and for transmitting said modulated first wave signal.

22. A color-television apparatus for developing a composite video-frequency signal comprising: means for generating color signals and for selecting color-signal components therefrom; a first signal-translating channel for developing a monochrome signal from said color signals and having a network with a predetermined pass band for translating at least the low-frequency component of said monochrome signal; signal-generating means for developing a wave signal; a second signal-translating channel for translating at least two of said color-signal components and coupled to said signal-generating means for effectively multiplex-modulating said wave signal by said translated color-signal component to develop a composite color-signal component, said second channel including means for translating said composite color-signal component; and a circuit for combining said translated component of said monochrome signal and said developed composite color-signal component to form said composite video-frequency signal.

References Cited in the file of this patent

UNITED STATES PATENTS

| | | |
|---|---|---|
| 2,335,180 | Goldsmith | Nov. 23, 1943 |
| 2,375,966 | Valensi | May 15, 1945 |
| 2,423,769 | Goldsmith | July 8, 1947 |
| 2,492,926 | Valensi | Dec. 27, 1949 |
| 2,509,038 | Goldsmith | May 23, 1950 |
| 2,554,693 | Bedford | May 29, 1951 |
| 2,580,685 | Mathes | Jan. 1, 1952 |
| 2,657,253 | Bedford | Oct. 27, 1953 |

OTHER REFERENCES

"A Six Megacycle Compatible High-Definition Color Television System," Television, vol. VI, pages 270–290, published by RCA Review.